(12) United States Patent
Wang-Munson et al.

(10) Patent No.: US 11,209,590 B1
(45) Date of Patent: Dec. 28, 2021

(54) EDGE-LIT LIGHTING SYSTEMS AND METHODS

(71) Applicant: RAB Lighting Inc., Northvale, NJ (US)

(72) Inventors: Dan Wang-Munson, Bergenfield, NJ (US); Wengang Gao, Ningbo (CN); Cecil Thomas, Demarest, NJ (US); Mario A. Turchi, Tenafly, NJ (US); Steven Madsen, New York, NY (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 17/067,212

(22) Filed: Oct. 9, 2020

(51) Int. Cl.
*F21V 8/00* (2006.01)
*F21K 9/61* (2016.01)
*F21S 8/02* (2006.01)

(52) U.S. Cl.
CPC .............. *G02B 6/0068* (2013.01); *F21K 9/61* (2016.08); *F21S 8/026* (2013.01); *G02B 6/0051* (2013.01); *G02B 6/0055* (2013.01); *G02B 6/0078* (2013.01)

(58) Field of Classification Search
CPC ...... F21S 8/02; F21S 8/026; F21S 8/03; F21S 8/031; F21S 8/038; F21K 9/61
See application file for complete search history.

(56) References Cited

U.S. PATENT DOCUMENTS

| | | | |
|---|---|---|---|
| 9,069,106 B1 * | 6/2015 | Blessitt | G02B 6/0073 |
| 9,518,722 B1 | 12/2016 | Lehman | |
| 10,488,023 B1 * | 11/2019 | Rao | F21V 21/048 |
| 2005/0135115 A1 | 6/2005 | Lamb et al. | |
| 2008/0266843 A1 * | 10/2008 | Villard | F21V 29/74 362/147 |
| 2011/0103042 A1 * | 5/2011 | Tirrell | E04B 9/068 362/147 |
| 2013/0155719 A1 | 6/2013 | Brott et al. | |
| 2014/0313776 A1 | 10/2014 | Grigore | |
| 2016/0369951 A1 | 12/2016 | Liu et al. | |
| 2018/0088270 A1 | 3/2018 | Tuohioja et al. | |
| 2019/0170927 A1 | 6/2019 | Li et al. | |
| 2019/0324189 A1 | 10/2019 | York | |

OTHER PUBLICATIONS

Orgatech; Prisma 3100 Indoor LED Product Sheet; Nov. 2018.
Maxlite; Photon Max LED Spot Light; Nov. 21, 2019.
Two Tone Kitchens; Quadra Plus LED Under Cabinet Light; Feb. 4, 2016.

* cited by examiner

*Primary Examiner* — Keith G. Delahoussaye
(74) *Attorney, Agent, or Firm* — Frost Brown Todd LLC; Dennis S. Schell (57) ABSTRACT

A luminaire includes a first plurality of lighting elements, a housing, and a first lightguide. The housing includes a body and first and second edge frames coupled with the body. The first and second edge frames are positioned on opposing sides of the body and are separated by a first distance. The first plurality of lighting elements is further positioned on the first edge frame. The first lightguide is positioned along the first edge frame in proximity to the first plurality of lighting elements and is configured to receive light from the first plurality of lighting elements. Further, the first lightguide extends a second distance along a plane toward the second edge frame, with the second distance being less than the first distance.

24 Claims, 14 Drawing Sheets

EDGE-LIT LIGHTING SYSTEMS AND METHODS

FIELD

Embodiments of the present disclosure relate generally to lighting systems, for example lighting fixtures, and to improved edge-lit troffer lighting fixtures that direct light away from a mounting surface.

BACKGROUND

In an effort to meet demand for devices that use less energy, manufacturers of lighting devices have started manufacturing lighting devices that are more efficient than traditional devices using incandescent light bulbs. One example has been the use of light emitting diodes (LEDs) in lighting fixtures (also referred to herein as "luminaires"). More specifically, "edge lit" flat panel LED luminaires may be preferred in areas requiring the installation of lighting devices which have a generally flat form factor. Edge-lit luminaires typically include a thin and lightweight housing having one or more edges of the flat panel which houses LED light sources, such as an elongated LED strip spanning across the edge. From the edge of the housing, portions of light emitted by the LEDs can transfer from the edges toward the middle of the panel by use of a medium (e.g., a lightguide) that evenly redirects and reflects the light toward the illumination surface of the light fixture. The light dispersion of edge lit panels can create an even light distribution that appears shadow-less at the illumination surface.

However, it was realized by the inventors of the current disclosure that problems exist with how these more efficient light sources are utilized and that improvements in light fixtures to meet various needs, including the aesthetic and light distribution needs of consumers. Certain preferred features of the present disclosure address these and other needs and provide other important advantages.

SUMMARY

Embodiments of the present disclosure provide improved lighting fixtures, including improved edge-lit troffer lighting fixtures which are commonly used to illuminate indoor spaces such as office and commercial spaces.

At least one embodiment of the present disclosure includes a first plurality of lighting elements, a housing, and a first lightguide. The housing can include a body and first and second edge frames can be coupled with the body. The first and second edge frames can be positioned on opposing sides of the body and can be separated by a first distance. The first plurality of lighting elements can be further positioned on the first edge frame. The first lightguide can be positioned along the first edge frame in proximity to the first plurality of lighting elements and can be configured to receive light from the first plurality of lighting elements. Further, the first lightguide can extend a second distance along a plane toward the second edge frame, and the second distance can be less than the first distance.

At least one other embodiment of the present disclosure includes a second plurality of lighting elements and a second lightguide. The second plurality of lighting elements can be positioned on the second edge frame. The second lightguide can be secured to the second edge frame in proximity to the second plurality of lighting elements, and the second lightguide can be configured to receive light from the second plurality of lighting elements. The second lightguide can further extend a third distance along the plane toward the first edge frame, and the third distance can be less than the first distance.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

The drawings are not intended to be limiting in any way, and it is contemplated that various embodiments of the technology may be carried out in a variety of other ways, including those not necessarily depicted in the drawings.

The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure provide an improved luminaire (for example, a light fixture) that directs light away from a mounting surface. The luminaire may be configured for attachment to a mounting structure with a certain shape, such as a ceiling where the shape is a flat plane, and the arrangement of the components in the luminaire creates a lighting pattern suitable for that particular mounting structure. At least one embodiment of the present disclosure is configured to mount to a ceiling and direct light from a light emitting member (which may include one or more light sources, for example, one or more light emitting diodes (LEDs)) downward to illuminate the support surface (for example, the floor) below the luminaire and simultaneously direct light from the light emitter upward toward the ceiling. A light directing member, such as a lightguide, can receive the light from the light emitter and direct a portion of the light away from the mounting surface. An example use of this embodiment is to place the luminaire in an enclosed structure, such as a commercial office, where the downward light illuminates the floor of the office.

In a least one embodiment, the light director is a generally planer lightguide that receives the light generated by the one or more light emitters and directs the light away from the mounting surface. One example embodiment is a ceiling mounted luminaire suitable for mounting in an indoor environment, such as an office, hallway, or the like, where the lighting is primarily directed downward toward a floor.

In some embodiments, the imperfections in manufacturing the lightguide can result in more light being directed in lateral directions than desired. In these embodiments, a member that blocks the light (for example, a reflector) covers top and/or side portions of the lightguide surface, and is used to direct (for example, reflect) light emanating upward or laterally from the lightguide back downward and away from the mounting surface.

Figure 1:
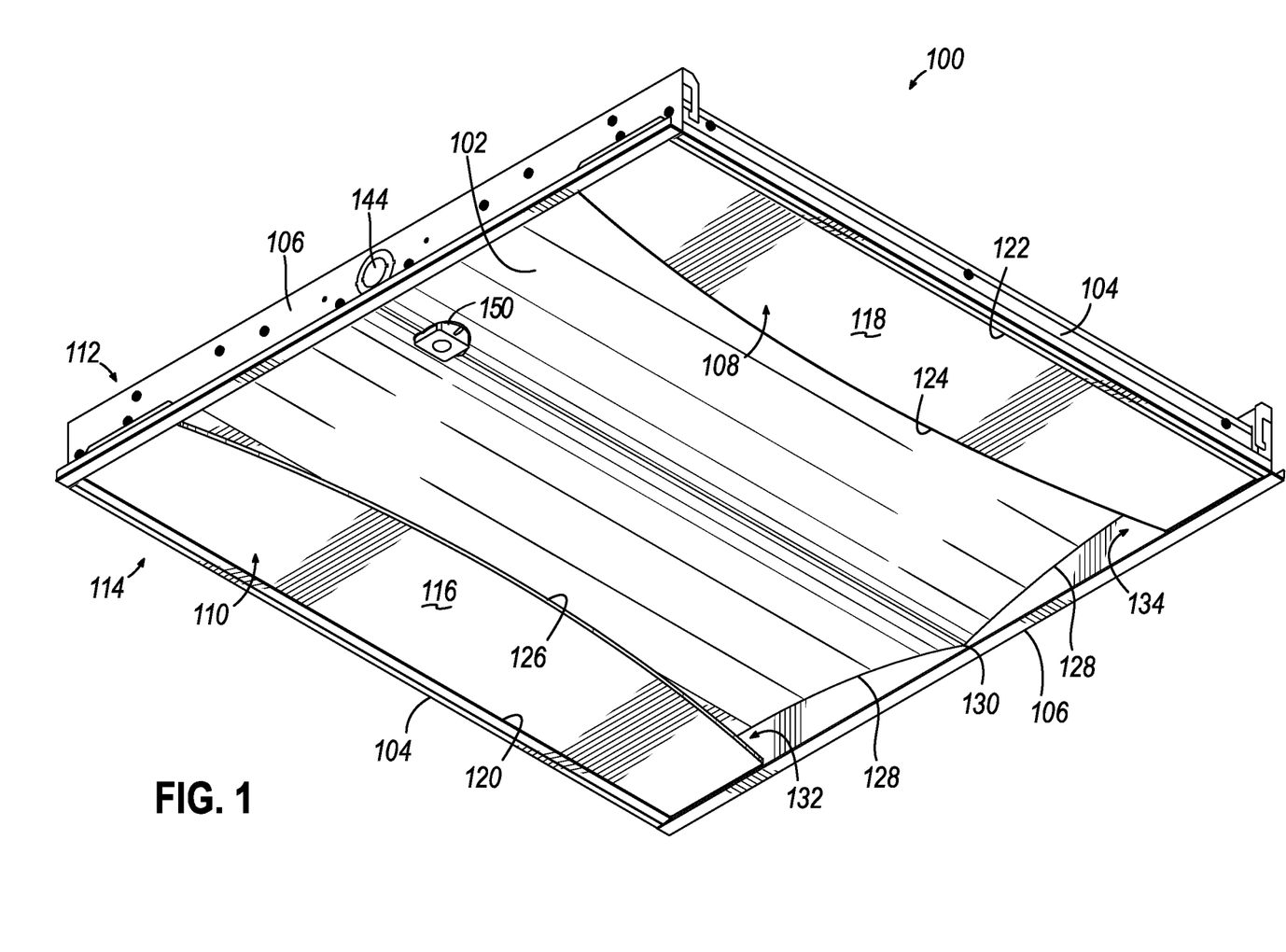
FIG. 1 depicts a lower perspective view of a first embodiment of an edge-lit lighting system.

Depicted in FIGS. 1-7 is a luminaire 100 according to one embodiment of the present disclosure. Luminaire 100 generally includes a housing 102 coupled between opposing side frames 104 and opposing end frames 106, and one or more lightguides 108, 110 for directing light away from the plane defined by housing 102. Luminaire 100 is configured for mounting onto a ceiling or wall, with housing 102 defining a mounting-side plane 112 (FIG. 2) and an illumination plane 114 (FIG. 1). The mounting-side plane 112 is configured to face the mounting surface, or otherwise face in a direction opposite to illumination plane 114. Illumination plane 114 faces the area to be illuminated, for example, downward toward a floor if luminaire 100 is mounted onto a ceiling. As will be described in greater detail below, opposing side frames 104 and opposing end frames 106 include features to secure luminaire 100 to a mounting surface such that illumination plane 114 is seated flush, or nearly flush, with the mounting surface. Frames 104, 106 of luminaire 100 collectively define a two-foot by two-foot troffer light fixture sized for insertion into a drop-style tiled ceiling; however, it should be understood that the length of frames 104, 106 could be varied in any number of configurations or proportion, including, for example, a two-foot by four-foot troffer light fixture.

As shown in FIGS. 1-4, housing 102 includes a curved "V" shape as defined by curved portions 128 separated by apex 130. Apex 130 spans across housing 102 terminating near opposing end frames 106 and is positioned centrally between opposing side frames 104 of housing 102. As such, luminaire 100 may appear to an observer to include two side-by-side illuminated halves, each half including a lightguide 108, 110. Particularly, in some embodiments, luminaire 100 may resemble a "double-basket" style troffer light fixture. On the opposing surface of housing 102, on mounting side plane 112, an electrical housing 146 is secured to housing for storing electrical wiring, electrical controlling devices such as LED drivers, or other lighting components. To reduce the overall depth 136 (see FIGS. 5-6) of luminaire 100, electrical housing 146 may be positioned on the opposing side of apex 130 of housing 102, whereby apex 130 creates a spatial void on mounting side plane 112.

Lightguides 108, 110, according to one embodiment of the present disclosure, are positioned such that light illuminates in a direction away from housing 102. Specifically, lightguides 108, 110 may be "edge-lit" lightguides having planar bodies configured to receive light from a light source (FIGS. 8-9) from one edge, such as outer edge 120, 122, and propagate the light internally through lightguide 108, 110 toward the opposing edge, such as inner edge 124, 126, distributing the light nearly evenly from illuminating surface 116, 118, wherein illuminating surfaces 116, 118 define illuminating plane 114. Edge-lit lightguides generally include inner surfaces having a plurality of grooves that redirect the light traveling laterally through the lightguide 108, 110 (from one end 120, 122 to the opposing end 124, 126) toward the desired direction of illumination. The desired direction in the orientation depicted in the exemplary illustrated embodiments is downward, from illuminating plane 114. One example of an edge-lit lightguide is described in U.S. Pat. Pub. No. 2020/0073046, entitled "Apparatuses and Methods for Efficiently Directing Light Toward and Away from a Mounting Surface," published Mar. 5, 2020, the disclosure of which is incorporated by reference herein. By utilizing edge-lit lightguides 108, 110 as opposed to traditional lighting elements, such as fluorescent bulbs, luminaire 100 may be constructed with an ultra-slim body defined by housing 102 and frames 104, 106. In the illustrated embodiment, luminaire 100 defines a mounting depth 136 (see FIGS. 5-6) of approximately 2.5 inches, making luminaire 100 ideal for environments lacking space, such as ceilings with low plenums. Further, by utilizing edge-lit lightguides 108, 110 as opposed to traditional lighting elements, luminaire 100 provides smoother illumination including less glare, as well as both direct and indirect lighting, relative to traditional luminaires.

To resemble a "double basket" style troffer light fixture, which generally includes two spatially separated elongated bulbs, two lightguides 108, 110 may be spaced apart at opposing sides of illuminating surface 116 of luminaire 100, separated by apex 130 of housing 102. As such, while light emitted from each lightguide 108, 110 will substantially be directed in directions perpendicularly away from luminaire, stray light from each lightguide 108, 110 will reflect off of housing 102 on the same side of apex 130 of that lightguide 108, 110 thereby providing a lighting effect similar to that of a light fixture having two separated bulbs. To create this lighting effect, a lightguide 108, 110 extends a first distance d1 from side frame 104 that is less than the full distance across housing 102, and in embodiments including both lightguides 108, 110, each lightguide 108, 110 extends a distance d1 from side frame 104 that is less than half the full distance across housing 102, thereby leaving a gap distance d2 between lightguides 108, 110. In the illustrated embodiment, lightguides 108, 110 include inner edges 124, 126 which are curved as they extend between opposing end frames 106. As such, gap distance d2 between lightguides 108, 110 may be less than gap distance d3 between lightguides 108, 110. However, in some embodiments, lightguides 108, 110 may include straight inner edges 124, 126 extending between opposing end frames 106 resulting in gap distances d2, d3 being equal.

Figure 7:
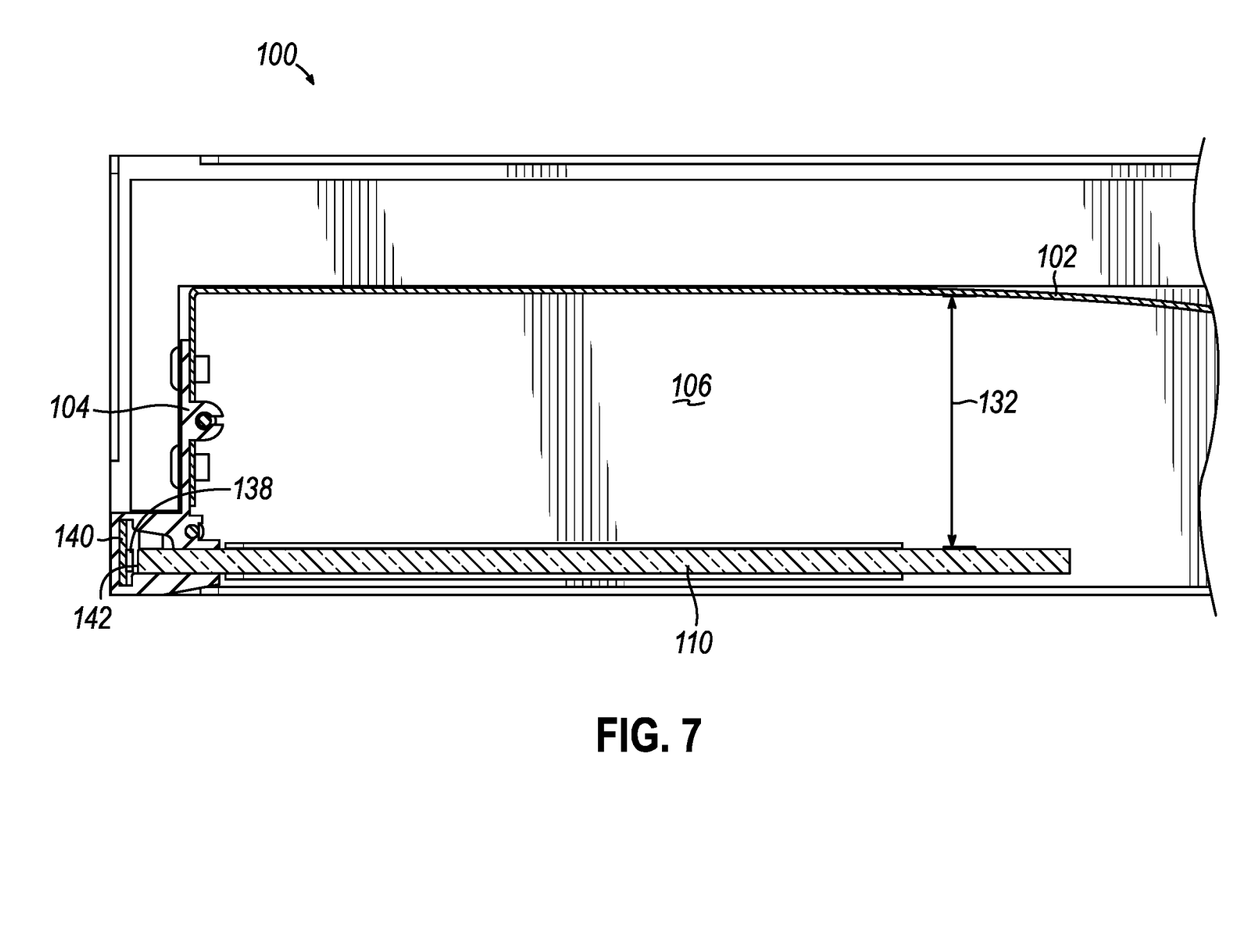
FIG. 7 depicts a cross-sectional view of the edge-lit lighting system of FIG. 1 taken along line FIG. 7-FIG. 7 of FIG. 4.

As shown in FIGS. 1 and 7, an open chamber is formed by frames 104, 106, curved portions 128, and lightguides 108, 110, with the opening to the chamber being defined between inner edges 124, 126. Portions of the chamber further define air gaps 132, 134, with lightguides 108, 110 being spatially separated from housing 102 to form air gaps 132, 134. Gaps 132, 134 may separate lightguides 108, 110 from housing 102 by approximately 0.8-2.5 inches, or in some embodiments, approximately 1.3 inches. Gaps 132, 134, or variations of gaps 132, 134 having different spatial sizing, may be included to achieve a particular desired illuminated appearance by altering the overall height of lightguides 108, 110, thereby affecting the optical distribution pattern and optical efficiency.

As shown in FIG. 7, each lightguide 108, 110 includes one or more light sources 138 (for example, Light Emitting Diodes-LEDs) and, in some embodiments (for example, embodiments utilizing LEDs), a base structure 140 to which the light sources 138 are mounted. The light source 138 may be arranged around the outer perimeter of lightguide 108, 110, as shown in FIG. 7 and positioned so that light emanating from the light sources 138 enters the outer edge of the lightguide 108, 110 adjacent opposing side frame 104. Advantages are realized by positioning the light sources 138 close to the surface of lightguide 108, 110 so that lightguide 108, 110 captures a substantial amount of the light being emitted from the light sources 138.

In some embodiments, the shape of the surface 142 of lightguides 108, 110 abutting light source 138 is similar to the shape of light source 138. For example, the surface 142 of lightguide 108 is planar as is the emitting surface of light source 138. However, in other embodiments the shape of lightguides 108, 110 and the adjacent surfaces 142 of lightguides 108, 110 may be different, such as when manufacturing efficiencies may dictate shapes that are different. Other embodiments include lightguides 108, 110 shapes that are triangular, square, rectangular, hexagonal, or other shapes that may be desirable form either an aesthetic or manufacturing perspective.

Figure 2:
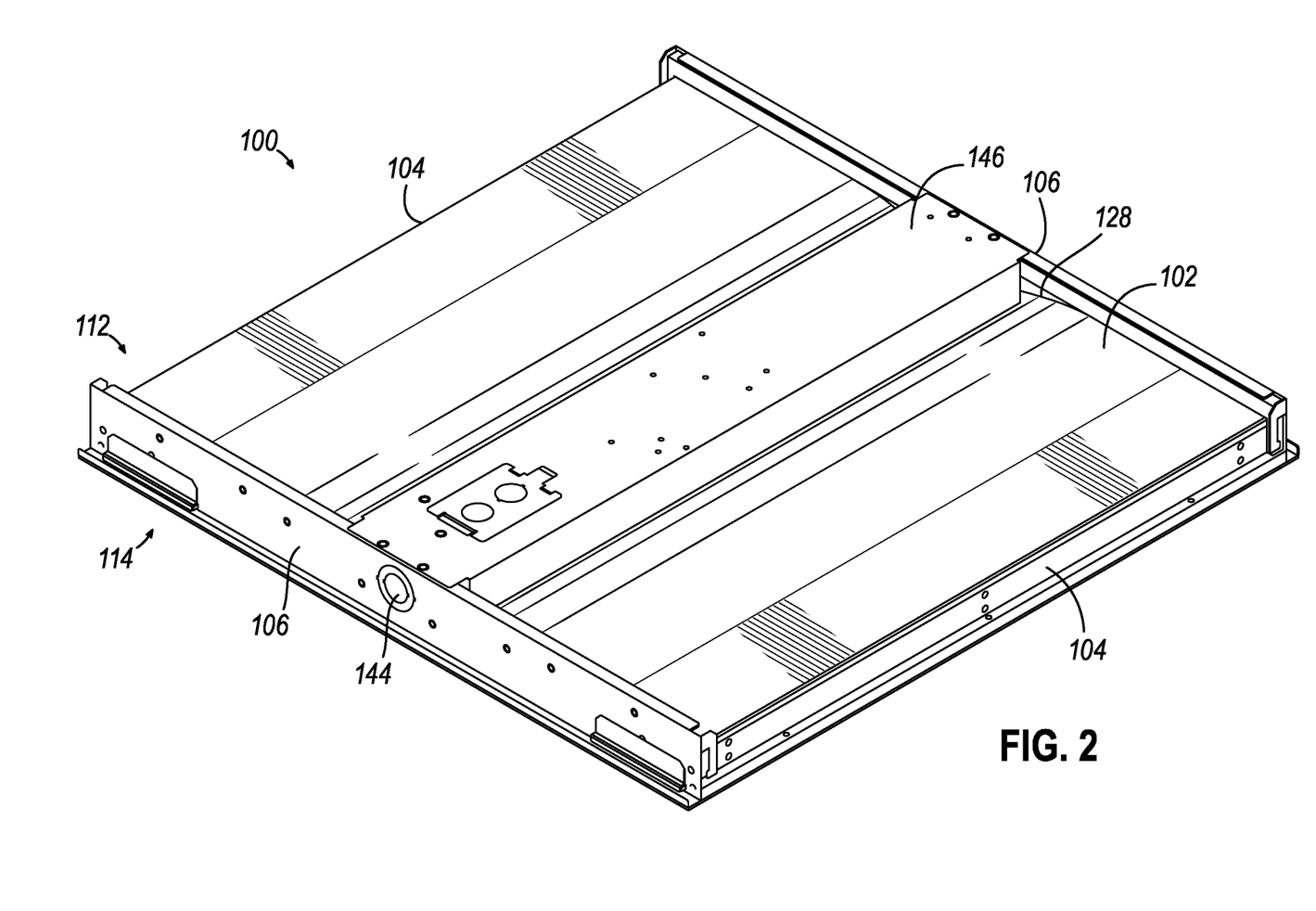
FIG. 2 depicts an upper perspective view of the edge-lit lighting system of FIG. 1.
Figure 3:
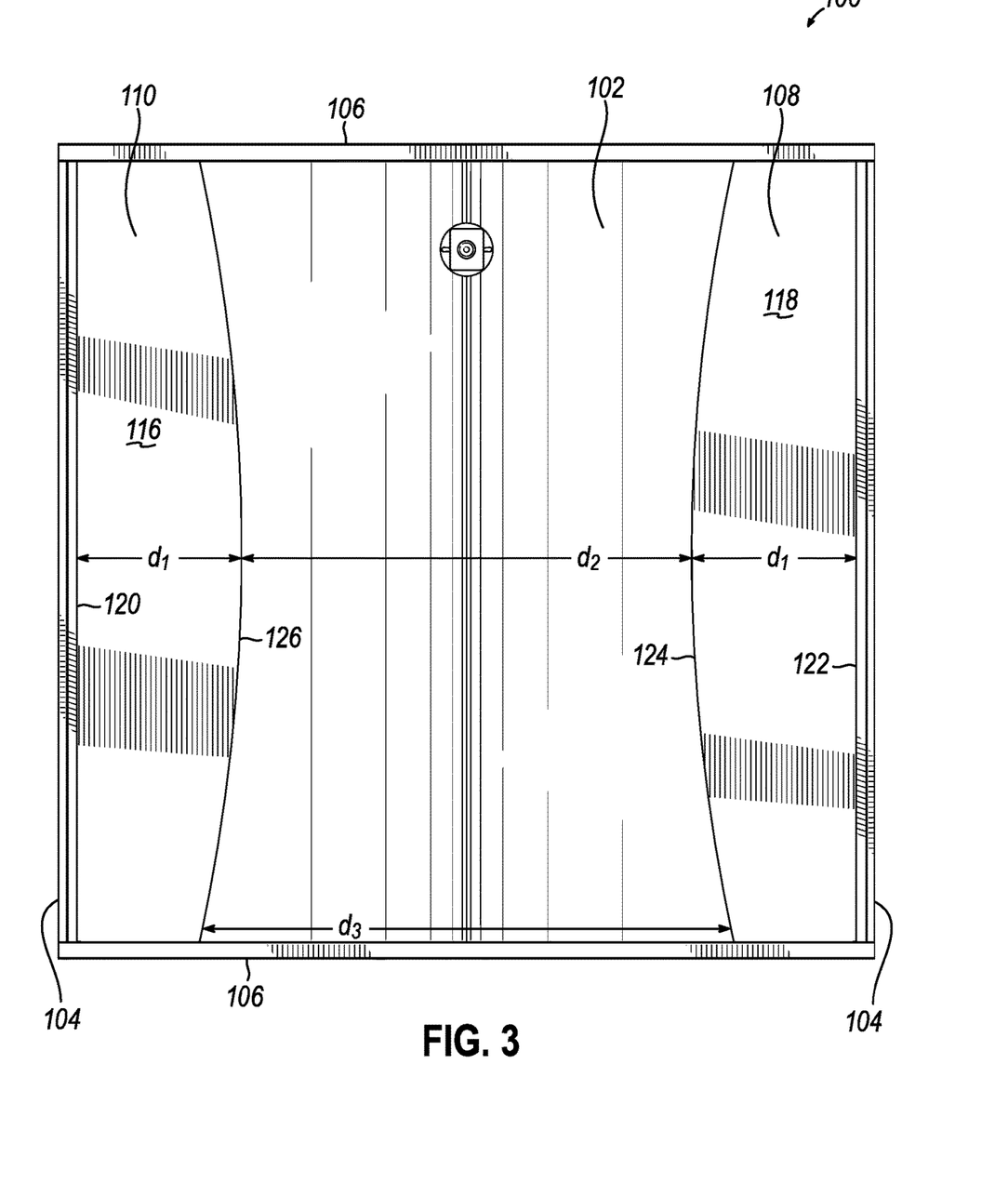
FIG. 3 depicts a bottom plan view of the edge-lit lighting system of FIG. 1.
Figure 4:
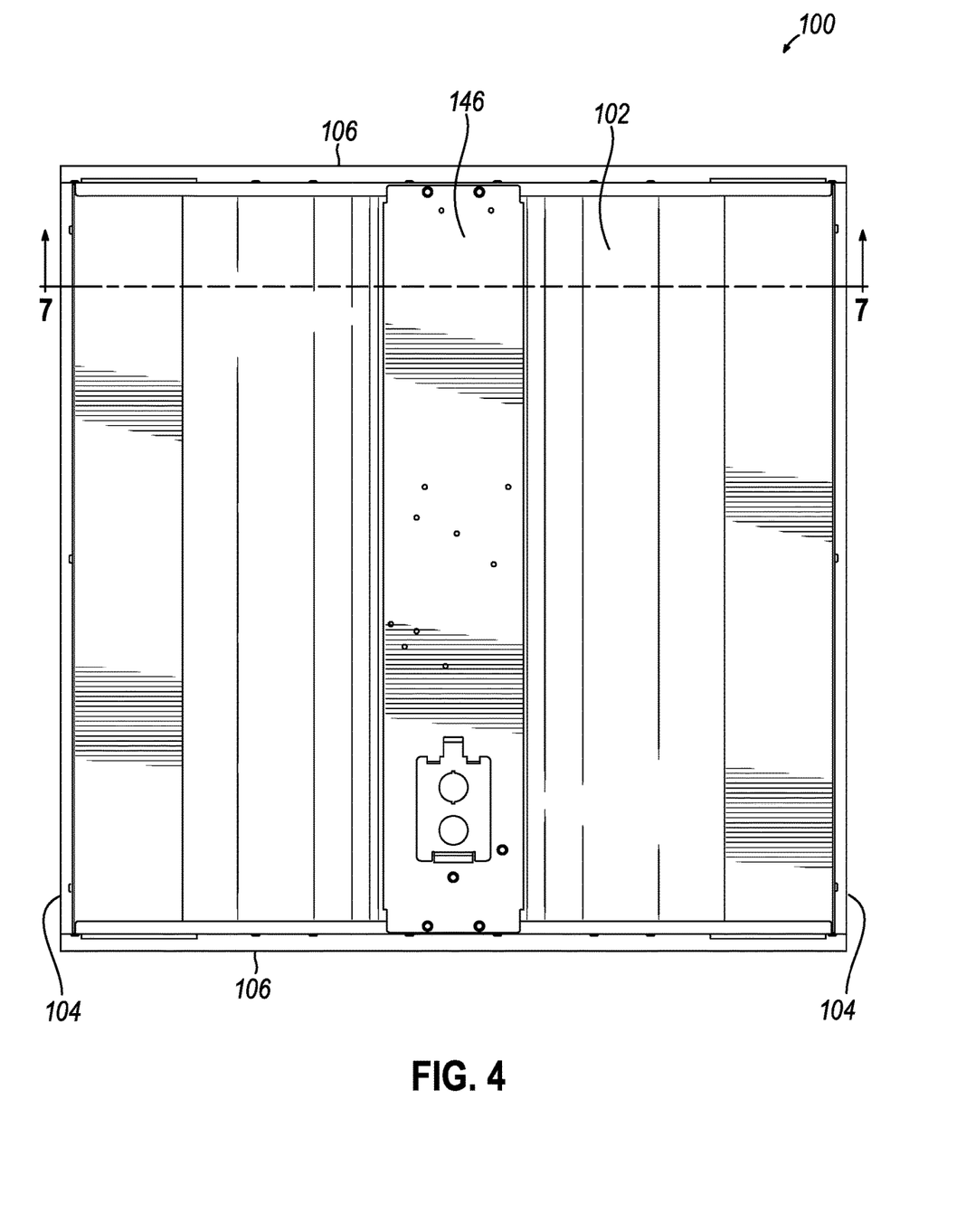
FIG. 4 depicts a top plan view of the edge-lit lighting system of FIG. 1.
Figure 5:
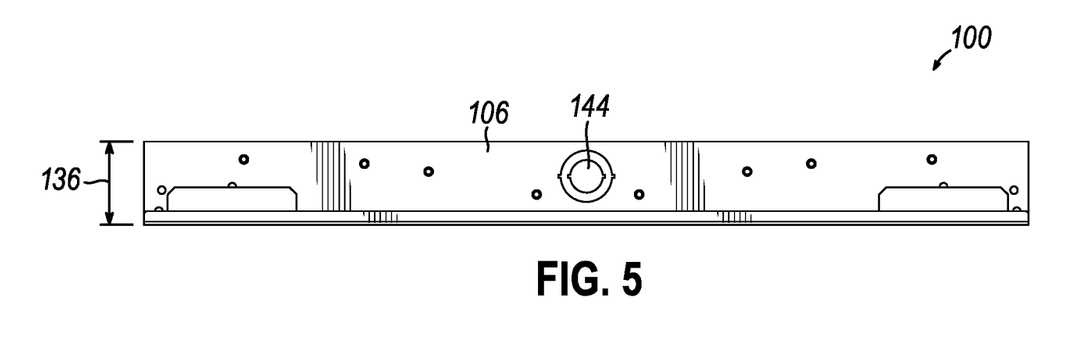
FIG. 5 depicts a right-side elevational view of the edge-lit lighting system of FIG. 1.
Figure 6:
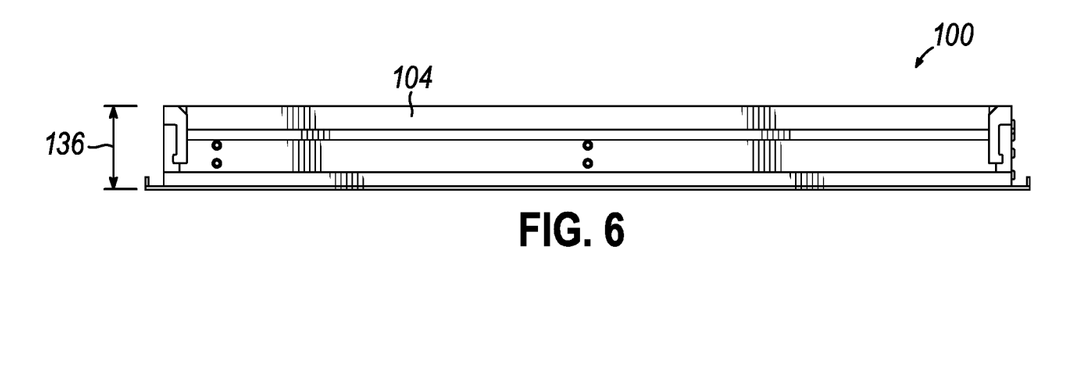
FIG. 6 depicts a front elevational view of the edge-lit lighting system of FIG. 1.

Luminaire 100 may include an optional accessory adapter 144 (see FIGS. 1, 2, and 5). Accessory adapter 144 typically includes electrical connectors so that when an accessory is attached to accessory adapter 144, the accessory will also be operationally connected to lightguides 108, 110 and/or any components within electrical housing 146, to provide the ability to add various features or controls to luminaire 100 without requiring replacement of luminaire 100. For example, motion sensors, ambient light sensors, or wired and wireless controllers that allow or provide remote operation of luminaire 100 can be attached to accessory adapter 144. In some embodiments, accessory adapter 144 may include a fluid-tight gasket to inhibit moisture intrusion into luminaire 100, a lock nut for securing accessory adapter 144 to luminaire 100, and/or a cap that may be utilized to occlude the opening in accessory adapter 144 to which an accessory can be connected.

Luminaire 100 may further include an optional motion sensor assembly 150. Motion sensory assembly 150 may be disposed on housing 102, such as along apex 130, or otherwise anywhere suitable on illuminating plane 114. Motion sensor assembly 150 may be configured to activate or deactivate light source 138 upon detection of motion nearby or below luminaire 100.

Figure 8:
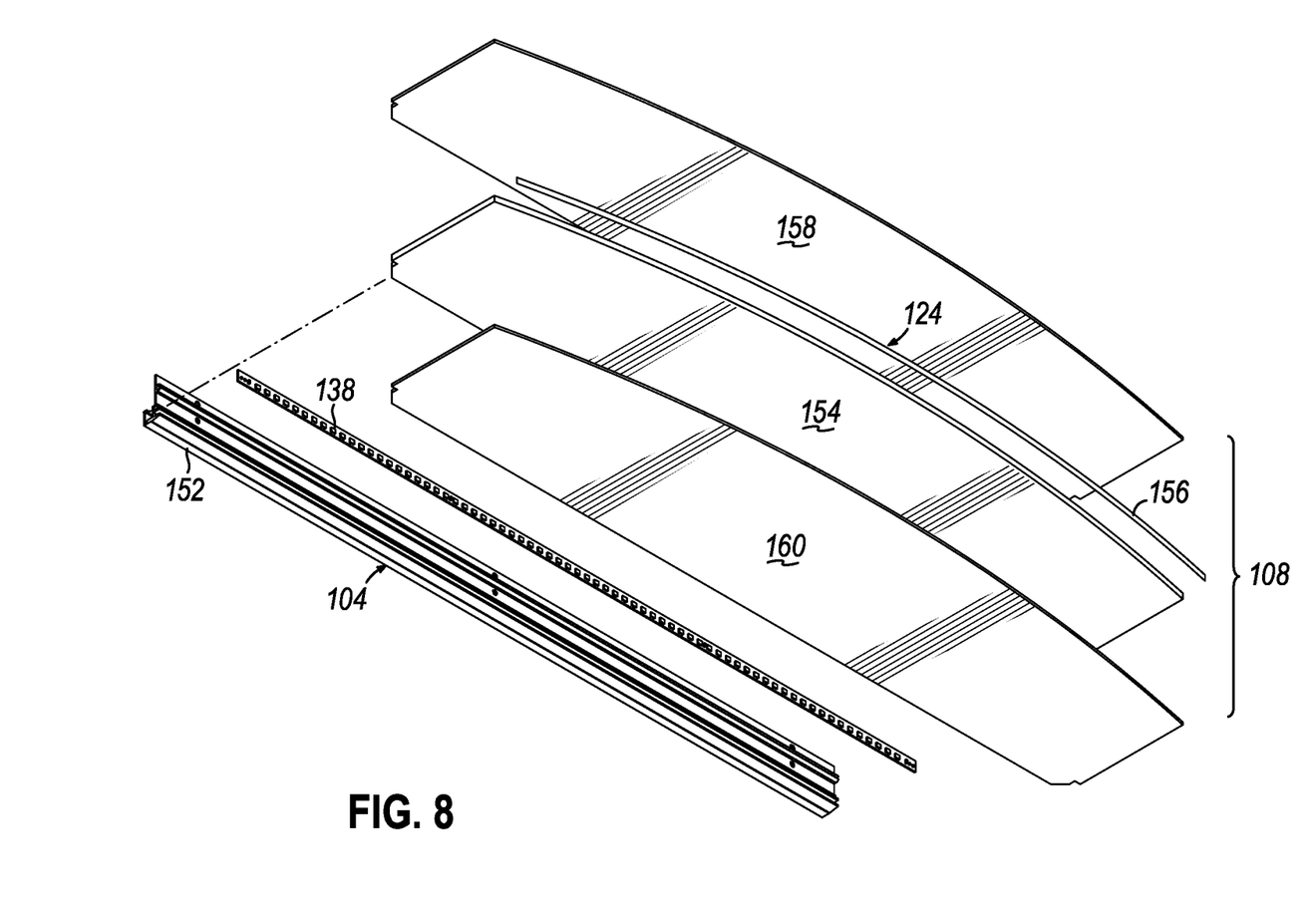
FIG. 8 depicts an exploded view of a light-guide of an edge-lit lighting system.

Depicted in FIG. 8 is one exemplary layered assembly of a lightguide 108, 110, as is shown with reference to lightguide 108. Lightguide 108 includes a heatsink 152 positioned along the side frame 104, which may be formed via extrusion, for securing light source 138 against lightguide plate 154. As is described above, lightguide plate 154 of lightguide 108 is configured to propagate light from light source 138 toward inner edge 124 while uniformly emanating light downward from lightguide plate 154. At inner edge 124 is a reflective tape 156. Reflective tape 156 may be formed with a white reflective material to reduce glare and may be glued or otherwise secured to inner edge 124 of lightguide plate 154. Particularly, reflective tape 156 reduces high angle glare caused by light reaching inner edge 124, as reflective tape 156 reflects the light backward toward light source 138. Lightguide 108 can also include optional components such as a back reflector 158 and a diffuser 160 that spans a portion or entire side of lightguide 108. Back reflector 158 may function as a mechanical support as well as an optical component to redirect the light downward away from housing 102 to increase optical efficiency and to generate more light within the 60-degree beam angle zone, and limiting or preventing the lightguide plate 154 from directly illuminating housing 102, thereby providing housing 102 with a darker appearance than lightguides 108, 110. Diffuser 160 may also be positioned on the bottom of lightguide plate 154 to reshape the light distribution and generate more light within the 60-degree beam angle zone. Optionally, two end caps (not shown) may be included to hold the multi-layer assembly of lightguide 108 together.

Figure 9A:
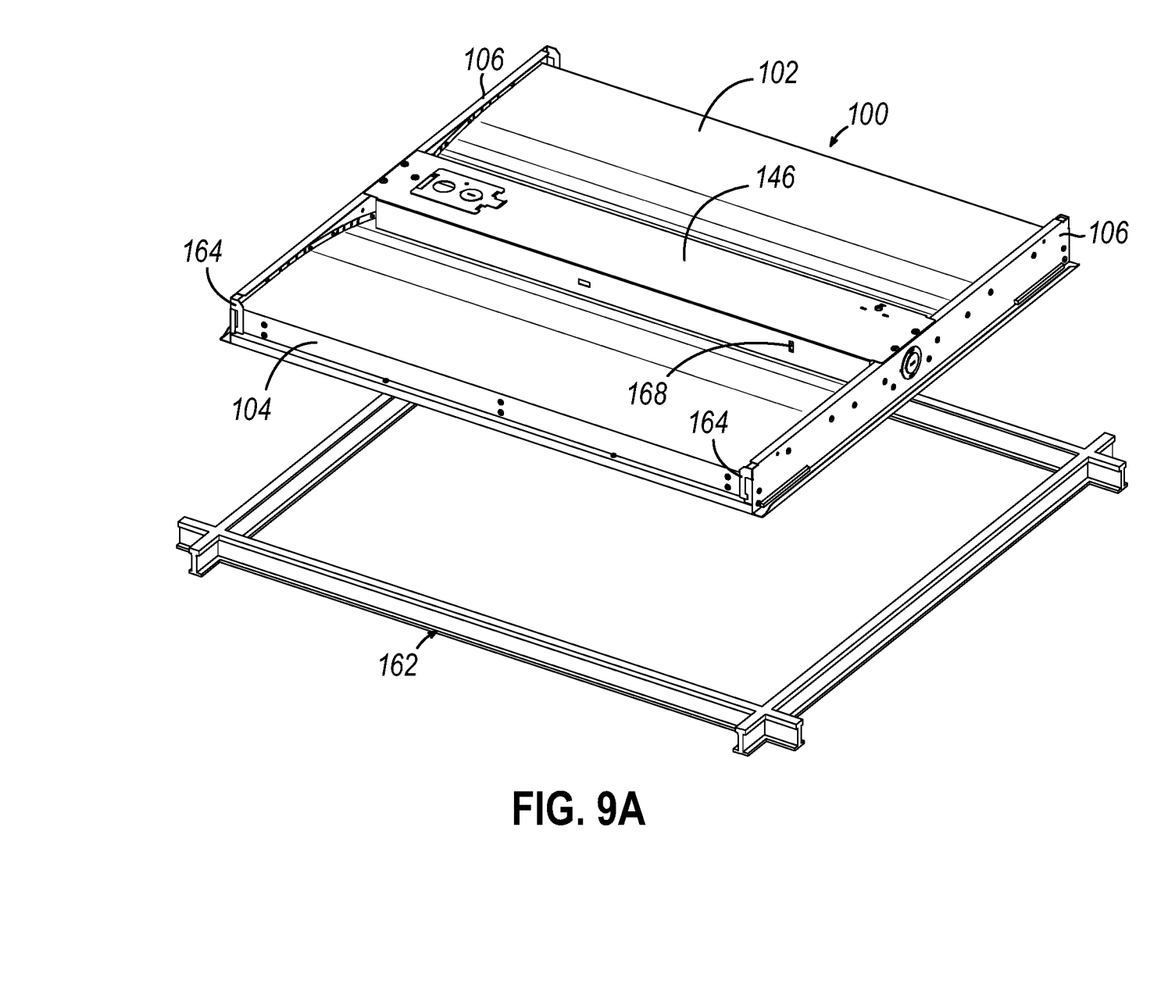
FIGS. 9A-D depict an exemplary technique of installing an edge-lit lighting system.
Figure 9B:
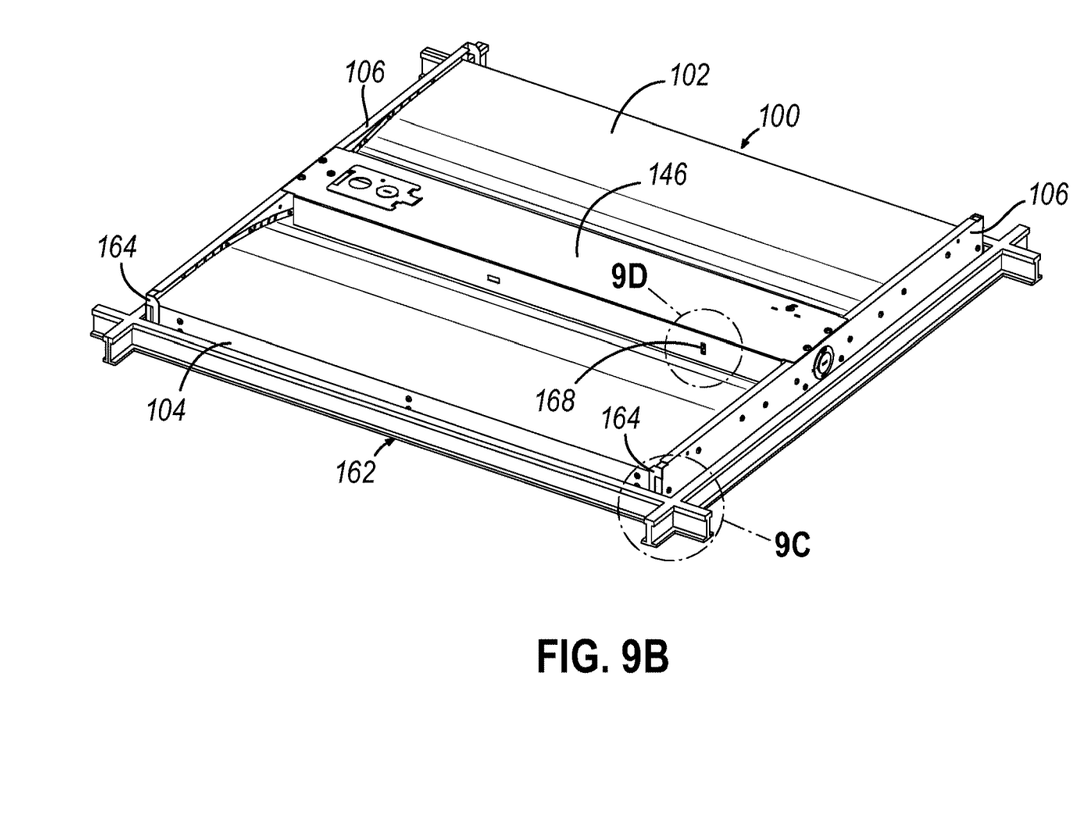
Figure 9C:
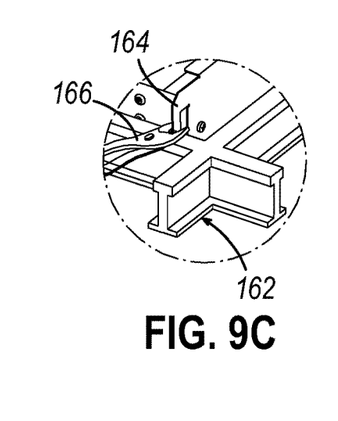
Figure 9D:
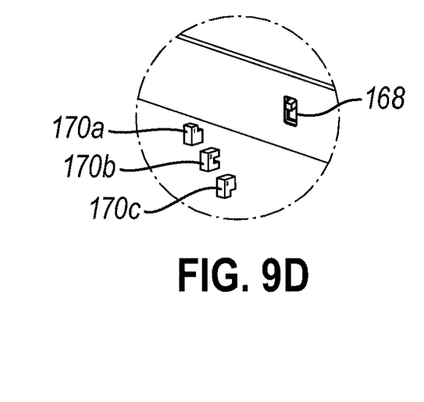
Figure 10:
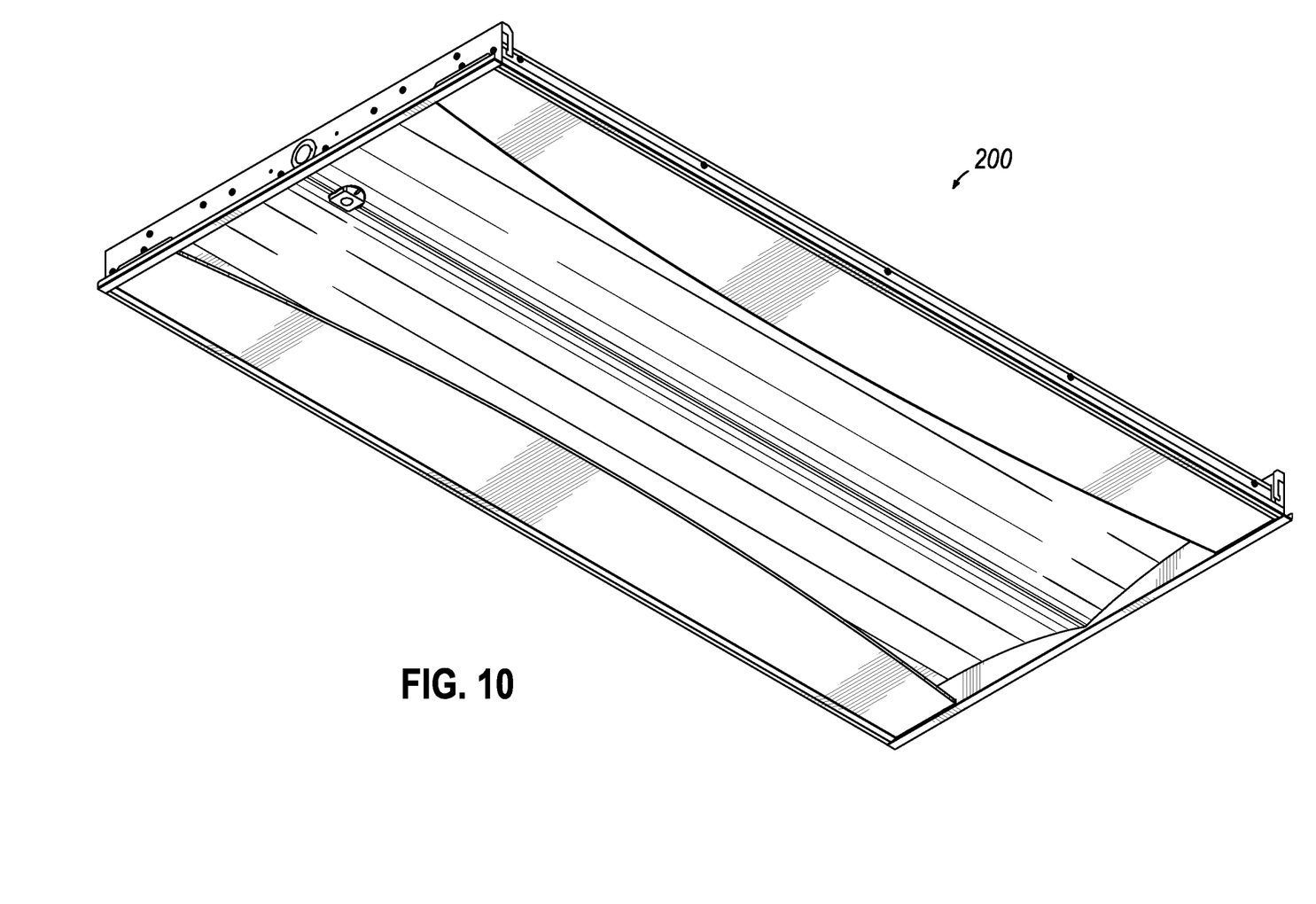
FIG. 10 depicts a lower perspective view of an alternative embodiment of an edge-lit lighting system.
Figure 11:
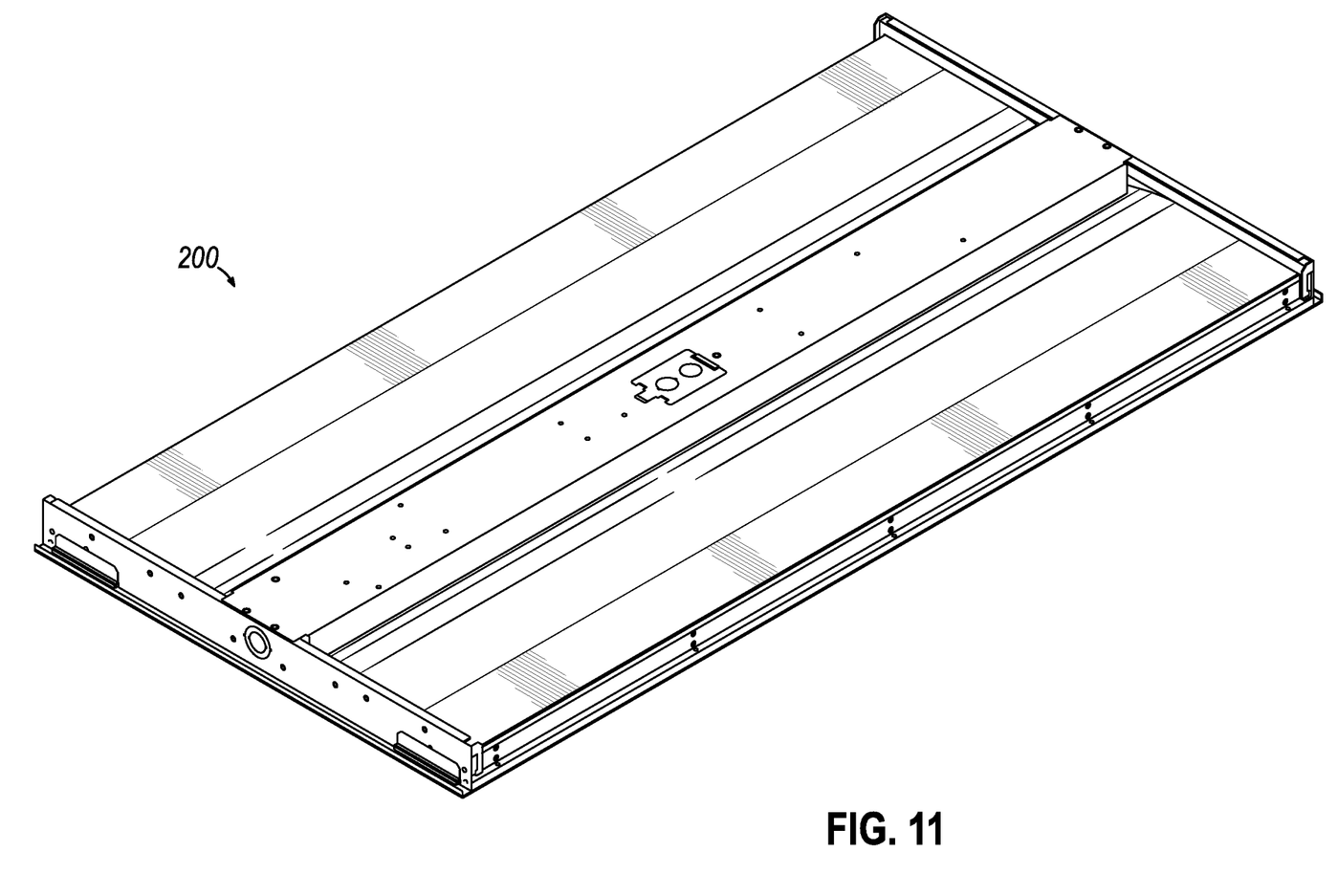
FIG. 11 depicts an upper perspective view of the edge-lit lighting system of FIG. 10.
Figure 12:
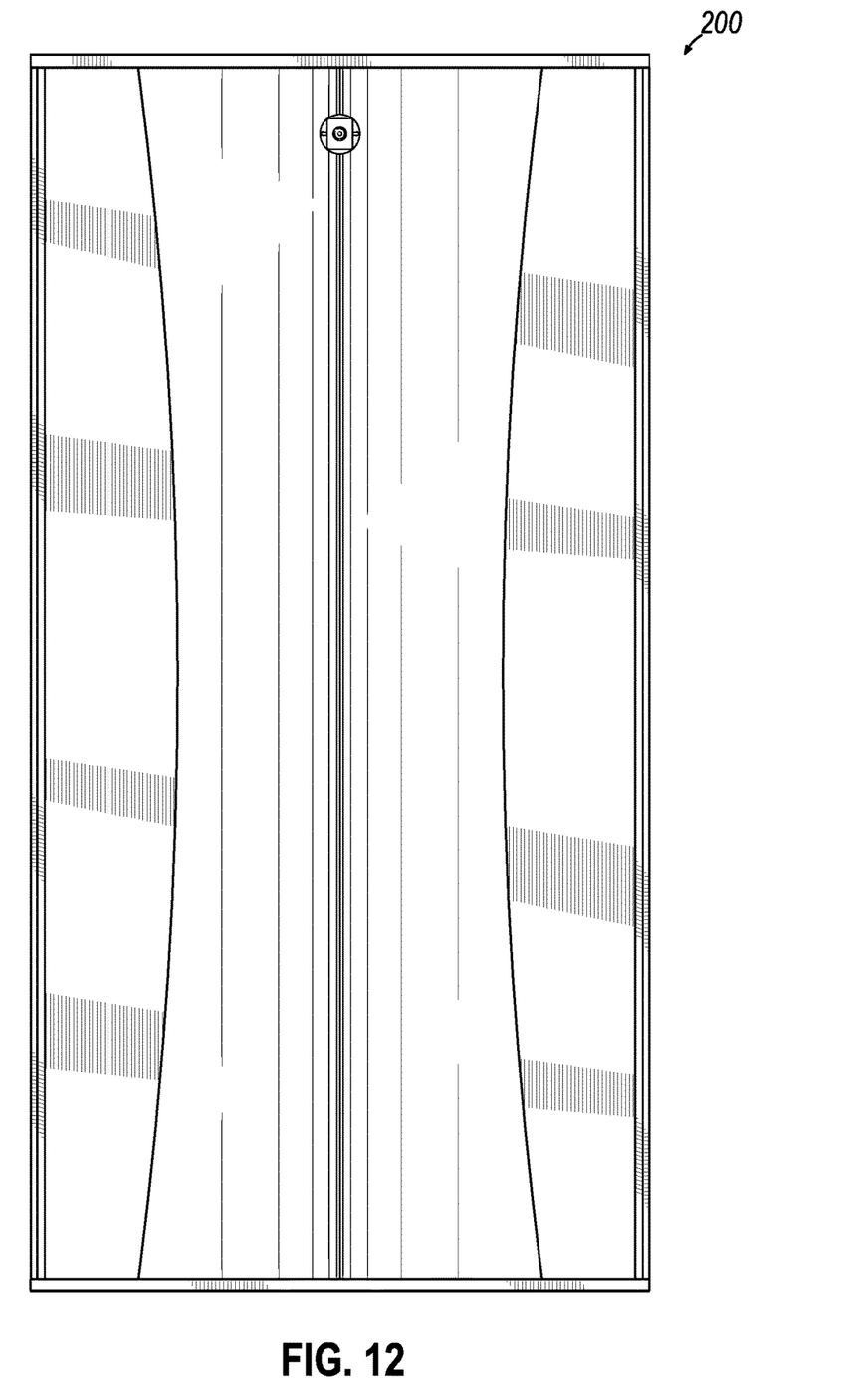
FIG. 12 depicts a bottom plan view of the edge-lit lighting system of FIG. 10.
Figure 13:
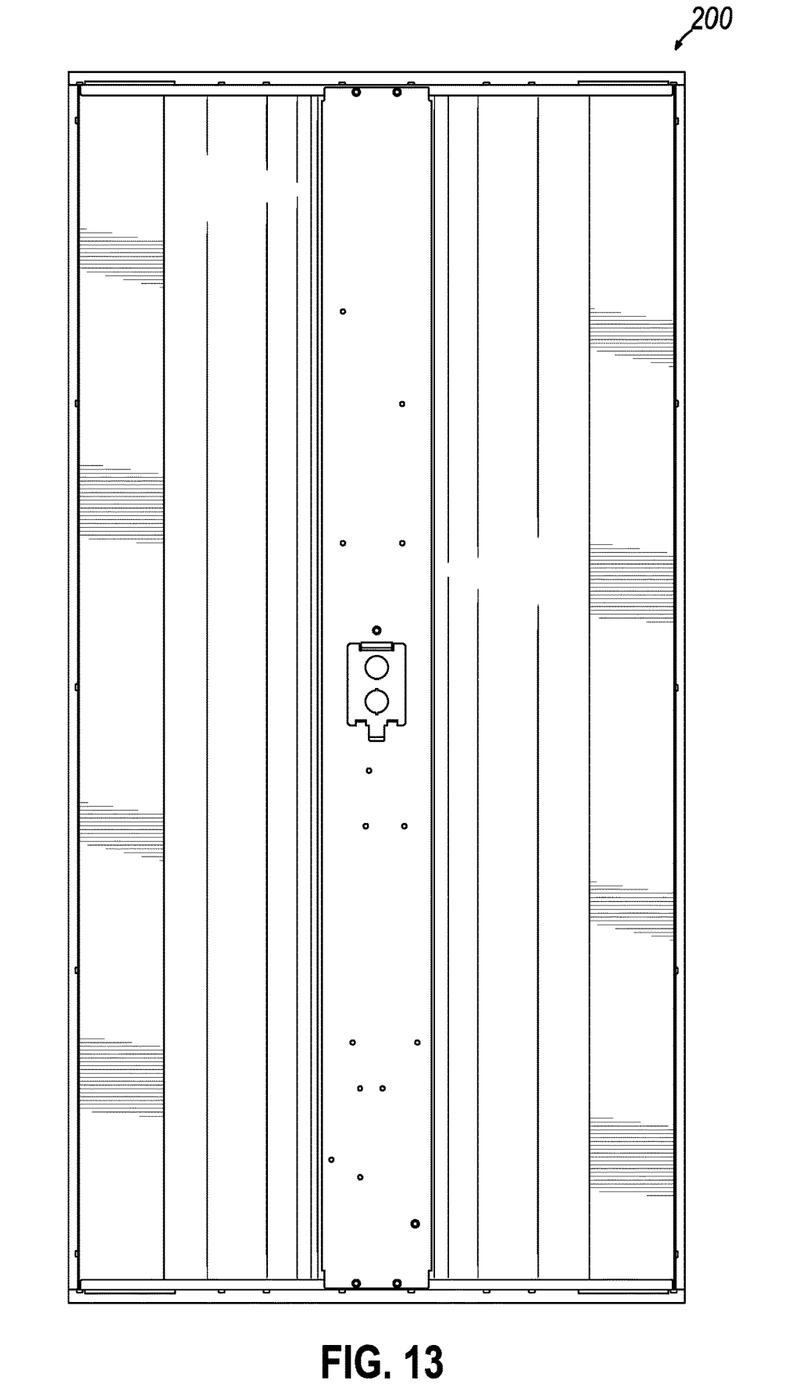
FIG. 13 depicts a top plan view of the edge-lit lighting system of FIG. 10.
Figure 14:
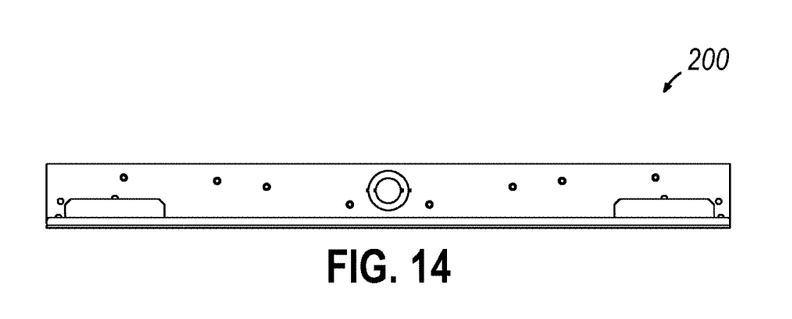
FIG. 14 depicts a right-side elevational view of the edge-lit lighting system of FIG. 10.
Figure 15:
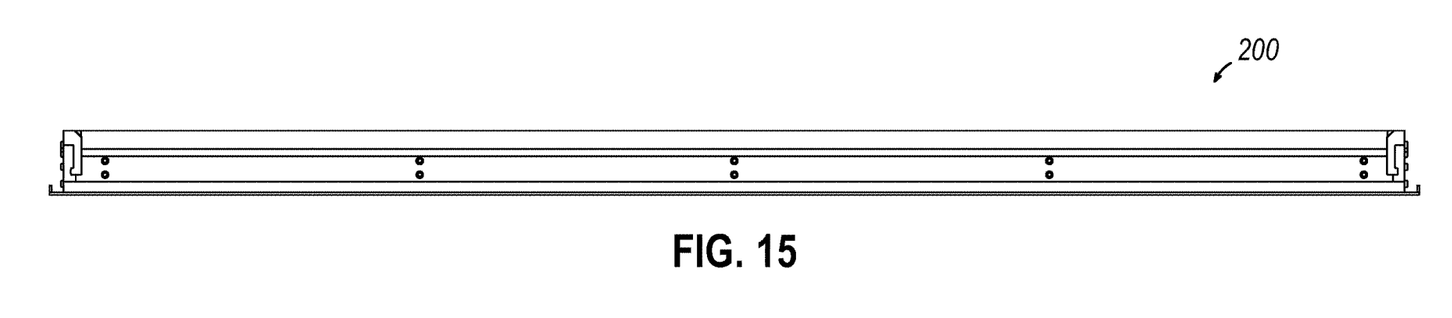
FIG. 15 depicts a front elevational view of the edge-lit lighting system of FIG. 10.

FIGS. 9A-B depict an exemplary technique of installing an edge-lit lighting system. As shown in FIG. 9A, luminaire 100 is first positioned within a mounting bracket assembly 162, for example, a flat-tee grid suspended ceiling assembly forming part of a drop ceiling. Once luminaire 100 is positioned within mounting bracket assembly 162 mounting bracket assembly 162, a user may extend one or more tabs 164 located at one or more corners of luminaire 100 over mounting bracket assembly 162 to fixedly secure luminaire 100 into place. As shown in FIG. 9B, pliers 166, or any other suitable tool, may be used to bend tabs 164 to secure luminaire 100 into vertical position with regard to mounting bracket assembly 162.

In some embodiments, lightguides 108, 100 include field adjustable power controls. For example, as shown in FIG. 9B, prior to or during installation, power selection switch 168 may be actuated between two or more positions to adjust the wattage output of luminaire 100. In some embodiments, luminaire 100 may include a factory default output setting of 29 watts and may permit a user to actuate power selection switch 168 upward to adjust the power output to 39 watts, or actuate power selection switch 168 downward to adjust the power output to 19 watts. Other embodiments of luminaires (such as luminaire 200 described below) may include a factory default output setting of 39 watts and may permit a user to actuate power selection switch 168 upward to adjust the power output to 49 watts, or actuate power selection switch 168 downward to adjust the power output to 29 watts. Once power selection switch 168 has been actuated into the desired position, one of a plurality of silicone plugs 170a-c may be inserted into luminaire 100 over power selection switch 168 to lock power selection switch 168 into position.

FIGS. 10-15 depict a luminaire 200 according to an exemplary alternative embodiment of the present disclosure. Luminaire 200 generally operated just like luminaire 100, which the only substantial difference being that luminaire 200 includes a more elongated form factor. Particularly, while luminaire 100 is formed with an approximately 2-foot length by 2-foot width dimension, luminaire 200 includes an approximately 4-foot length by 2-foot width dimension. As such, luminaire 200 is capable of mounting into or onto surfaces designed to accommodate a 4-foot by 2-foot luminaire, for instance, some tiled drop ceilings.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element (for example, mounting structure), or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A luminaire, comprising:
   a first plurality of lighting elements;
   a housing including
      a body, and
      first and second edge frames coupled with the body, wherein first and second edge frames are positioned on opposing sides of the body along a plane and are separated by a first distance, wherein the first plurality of lighting elements is positioned on the first edge frame; and
   a first lightguide positioned along the first edge frame in proximity to the first plurality of lighting elements, the first lightguide having a first edge located opposite the first edge frame; and
   wherein:
      the first lightguide is configured to receive light from the first plurality of lighting elements,
      the first lightguide extends a second distance along the plane toward the second edge frame,
      the second distance is less than the first distance, thereby forming an opening between the second edge frame and the first edge of the first lightguide, and
      the first edge is spaced apart from the body, thereby forming an air gap extending from the opening and between at least a portion of the first lightguide and the body.

2. The luminaire of claim 1, further comprising:
   a second plurality of lighting elements, wherein the second plurality of lighting elements is positioned on the second edge frame; and
   a second lightguide secured to the second edge frame in proximity to the second plurality of lighting elements, the second lightguide having a second edge located opposite the second edge frame; and
   wherein:
      the second lightguide is configured to receive light from the second plurality of lighting elements,
      the second lightguide extends a third distance along the plane toward the first edge frame,
      the third distance is less than the first distance thereby forming the opening between the second edge of the second lightguide and the first edge of the first lightguide, and
      the second edge is spaced apart from the body.

3. The luminaire of claim 2, wherein the body, the first lightguide, and the second lightguide collectively define perimeters of the air gap.

4. The luminaire of claim 2, wherein the second distance or the third distance is no more than half the length of the first distance.

5. The luminaire of claim 2, wherein the second distance and the third distance are each less than half of the first distance.

6. The luminaire of claim 2, further comprising a power selection switch disposed on the body, wherein the power selection switch is selectively operable to adjust a power output collectively emitted by the first lightguide and the second lightguide.

7. The luminaire of claim 1, wherein the first plurality of lighting elements includes LEDs, and the luminaire further comprises a lighting driver operable to provide power to the LEDs.

8. The luminaire of claim 1, wherein the first edge frame extends in a direction perpendicular to the first and second distances, wherein the first lightguide is coupled with a distal portion of the first edge frame relative to the body thereby defining the air gap between the body and the first lightguide.

9. The luminaire of claim 1, further comprising first and second end frames, the first and second end frames are coupled with the first and second edge frames to define a mounting perimeter, wherein the mounting perimeter is configured to mount onto a suspended ceiling.

10. The luminaire of claim 1, wherein the first lightguide includes a planar edgelit lightguide plate, wherein the planar edgelit lightguide plate is configured to emit the light from the first plurality of lighting elements in a direction perpendicular to the planar edgelit lightguide plate.

11. The luminaire of claim 10, wherein the first lightguide includes a reflector disposed between the planar edgelit lightguide plate and the body, wherein the reflector is configured to restrict illumination of the body from a top surface of the planar edgelit lightguide plate.

12. The luminaire of claim 10, wherein the first lightguide includes
a reflector tape disposed along a portion of a first inner edge of the first lightguide located opposite the first edge frame, wherein the reflector tape is configured to restrict light from emitting in a direction parallel to the plane; and
a diffuser coupled with a bottom surface of the planar edgelit lightguide plate, wherein the diffuser is configured to reshape the light emitted from the planar edgelit lightguide plate.

13. A luminaire, comprising:
a body;
a first plurality of lighting elements disposed along a first edge of the body;
a first planar lightguide secured to the first edge of the body, wherein the first planar lightguide is positioned adjacent the first plurality of lighting elements and is configured to receive light from the first plurality of lighting elements, wherein the first planar lightguide extends toward a second edge of the body opposite to the first edge, wherein a length is defined between the first edge and the second edge, and wherein the first planar lightguide extends a first distance that is no more than half the length of the length.

14. The luminaire of claim 13, further comprising:
a second plurality of lighting elements disposed along the second edge of the body; and
a second planar lightguide secured to the second edge of the body, wherein the second planar lightguide is positioned adjacent the second plurality of lighting elements and is configured to receive light from the second plurality of lighting elements, wherein the second planar lightguide extends toward the first edge of the body, wherein the second planar lightguide extends a second distance that is less than the length.

15. The luminaire of claim 14, wherein the body, the first planar lightguide, and the second planar lightguide collectively form a chamber, the chamber having an opening defined between a first inner edge of the first planar lightguide located opposite the first edge of the body and a second inner edge of the second planar lightguide located opposite the second edge of the body.

16. The luminaire of claim 14, wherein the first and second distances are each less than half of the length defined between the first edge and the second edge.

17. The luminaire of claim 13, wherein the first plurality of lighting elements includes LEDs, and the luminaire further comprises a lighting driver operable to provide power to the LEDs.

18. The luminaire of claim 13, wherein the first edge includes a first edge portion that extends in a direction perpendicular to the first and second distances, wherein the first planar lightguide is coupled with the first edge portion, wherein an air gap is formed between the body and the first planar lightguide.

19. The luminaire of claim 13, further comprising first and second ends, wherein the first and second ends are coupled with the first and second edges to define a mounting perimeter, wherein the mounting perimeter is configured to mount onto a suspended ceiling.

20. A luminaire, comprising:
a body;
a first plurality of lighting elements disposed along a first edge of the body;
a second plurality of lighting elements disposed along a second edge of the body, wherein the second edge positioned opposite to the first edge;
a first edgelit lightguide secured to the first edge of the body, wherein the first edgelit lightguide is positioned adjacent the first plurality of lighting elements and is configured to receive light from the first plurality of lighting elements,
a second edgelit lightguide secured to the second edge of the body, wherein the second edgelit lightguide is positioned adjacent the second plurality of lighting elements and is configured to receive light from the second plurality of lighting elements, wherein the first edgelit lightguide extends toward a second edge of the body opposite to the first edge.

21. The luminaire of claim 20, wherein a length is defined between the first edge and the second edge, wherein the first edgelit lightguide extends a first distance that is less than the length.

22. The luminaire of claim 21, wherein the second edgelit lightguide extends a second distance that is less than the length between the first edge and the second edge.

23. The luminaire of claim 22, wherein each of the first distance and the second distance is less than half of the length between the first edge and the second edge.

24. The luminaire of claim 20, wherein the first edge includes a first edge portion that extends in a direction perpendicular to the body, wherein the first edgelit lightguide is coupled with the first edge portion, wherein an air gap is formed between the body and the first edgelit lightguide.

* * * * *